US 6,732,029 B2

(12) United States Patent
Donahue et al.

(10) Patent No.: US 6,732,029 B2
(45) Date of Patent: May 4, 2004

(54) VERIFICATION ENGINE CONTROLLER SOFTWARE

(75) Inventors: Colleen M Donahue, Manchester, MI (US); Yi Cheng, Ypsilanti, MI (US); Gary L Seitz, Chelsea, MI (US); David A Barkman, Chelsea, MI (US); Robert T Forgiel, Tecumseh, MI (US); David P Ploucha, Ann Arbor, MI (US); Richard K Moote, Ann Arbor, MI (US); Zhong Li, Ann Arbor, MI (US); Howard W Krausman, Dexter, MI (US); Ronald A Yannone, Jr., Clinton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 104 days.

(21) Appl. No.: 10/131,753

(22) Filed: Apr. 24, 2002

(65) Prior Publication Data

US 2003/0204301 A1 Oct. 30, 2003

(51) Int. Cl.⁷ .............................................. G06F 19/00
(52) U.S. Cl. .......................... 701/33; 73/118.1; 701/29; 701/101; 702/183
(58) Field of Search ............................. 701/29, 31, 33, 701/34, 35, 62, 63, 101, 102, 103, 114, 115; 73/116, 117.3, 118.1; 324/379, 378, 402; 702/117, 118, 119, 121, 183, 185, 186, 187, 188; 340/438

(56) References Cited

U.S. PATENT DOCUMENTS

| 5,541,840 | A | * | 7/1996 | Gurne et al. .................. 701/33 |
| 5,651,349 | A | | 7/1997 | Dykstra et al. ............. 123/520 |
| 5,835,876 | A | | 11/1998 | Hathaway et al. ............ 701/62 |
| 6,181,992 | B1 | * | 1/2001 | Gurne et al. .................. 701/29 |
| 6,338,148 | B1 | | 1/2002 | Gillenwater et al. .......... 714/25 |
| 6,386,021 | B1 | * | 5/2002 | Carr et al. ................. 73/118.1 |
| 6,470,732 | B1 | * | 10/2002 | Breton ....................... 73/118.1 |
| 6,556,902 | B2 | * | 4/2003 | Ing et al. ...................... 701/29 |
| 2003/0130774 | A1 | * | 7/2003 | Tripathi et al. ............... 701/33 |

* cited by examiner

Primary Examiner—Willis R. Wolfe
(74) Attorney, Agent, or Firm—Edwin W. Bacon, Jr.

(57) ABSTRACT

A method of determining the quality of subsystems of an electronic engine control system is provided. The method monitors an engine parameter representative of a subsystem of interest and compares the parameter to at least one quality limit. The at least one quality limit represents an acceptable performance boundary for a fully functional engine control system. The method then indicates, based on the result of the comparison, whether the subsystem is of satisfactory quality. The method is arranged, without limitation, to determining the quality of start time, start flare, idle control during transmission shift, and speed control.

20 Claims, 8 Drawing Sheets

VERIFICATION ENGINE CONTROLLER SOFTWARE

FIELD OF THE INVENTION

This invention relates generally to a method for verifying the operation of an electronic engine control system, and, more particularly, to a method that uses objective criteria to verify the quality of an electronic engine control system.

BACKGROUND

In the automotive industry, it is desirable to verify an engine control system before sale of automobiles containing the system. One step of verifying the system involves having engineers observe the system during operation and then making a determination of the system quality. The step of verifying quality usually takes place a number of times during the development cycle of the engine control system and, using existing methods, typically consumes a considerable amount of time and effort.

It is known in the engine control art that a measurement of quality may be determined by at least two methods. One method is to have an experienced engineer operate the engine and make a subjective determination of whether the quality is satisfactory. This method lacks objective criteria for the engineer to base a determination of quality and therefore is prone to producing inconsistent determinations. A second method is for the engineer to record engine data during operation and then determine quality based on the data. While this second method produces more consistent determinations of quality than the first method, it has the disadvantage of requiring instrumentation for recording engine data and also produces voluminous data which the engineer must process.

SUMMARY OF THE INVENTION

Accordingly, one aspect of the present invention is to provide a relatively simple and reliable method of determining the quality of an engine control system, where the determination is based on objective criteria.

Another aspect of the invention is to provide a method of determining quality of an engine control system where the method does not require the processing of voluminous data.

In accordance with these aspects, a method is provided for determining the quality of the system where the method monitors an engine parameter representative of the quality of a subsystem of interest, compares the parameter to at least one quality limit, where the quality limits represent an outermost acceptable performance envelope for a fully functional engine control system, and, based on the result of the comparison, indicating whether the subsystem is of satisfactory quality.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

FIG. 3b is a timing diagram illustrating the start time test of FIG. 3a;

FIG. 4b is a timing diagram illustrating the start flare test of FIG. 4a;

DETAILED DESCRIPTION OF THE PREFERRED EMBODIMENT

Figure 1:
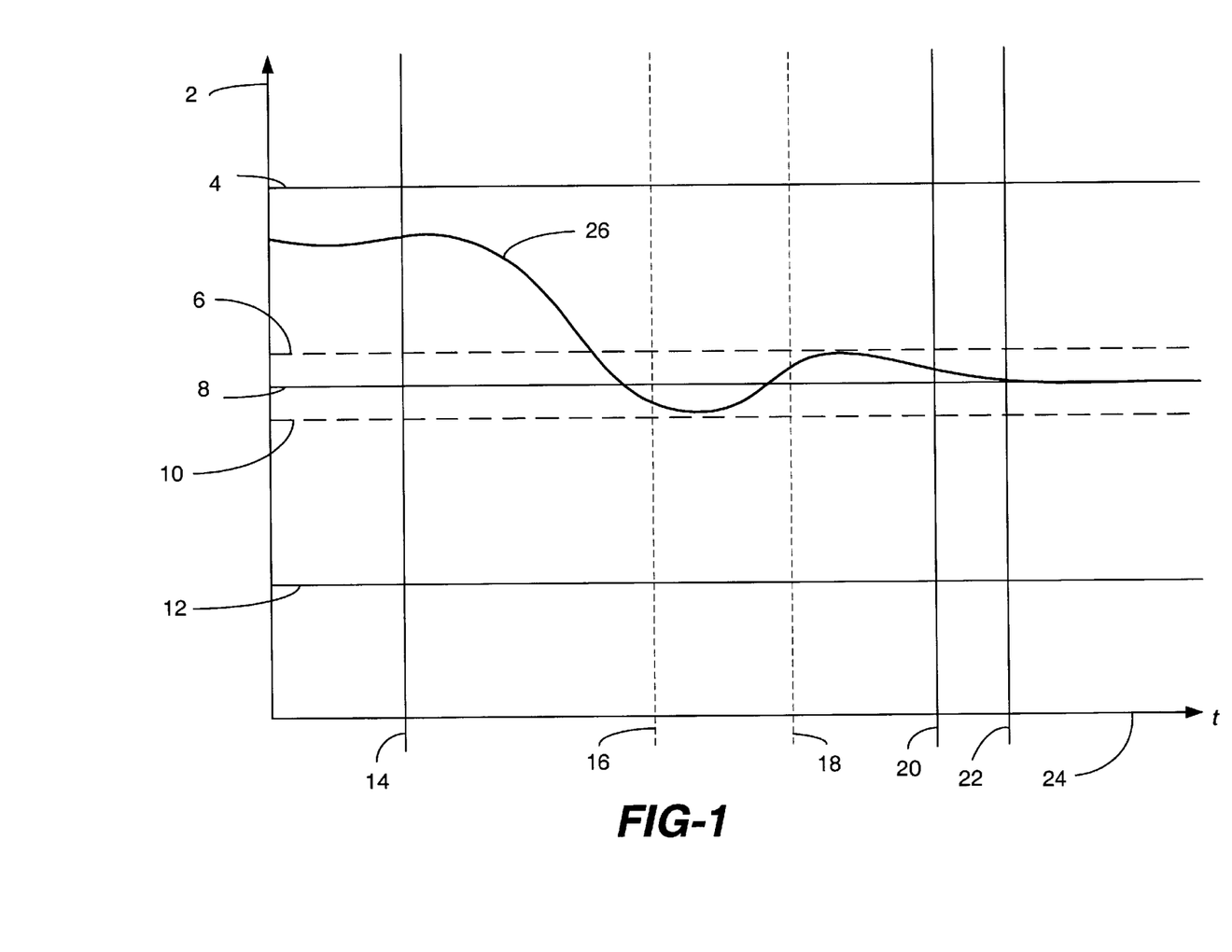
FIG. 1 is a timing diagram of the invention.

Turning now to FIG. 1, a timing diagram is shown. The vertical axis 2 of the diagram represents a physical unit of measure, such as revolutions per minute, degrees centigrade, etc. The horizontal axis 24 represents the passing of time. A physical parameter 26 is plotted over time. Failure limits 12 and 4 are known in the art and represent the outer limits at which parameter 26 is known to function. If parameter 26 exceeds upper failure limit 4 or is less than lower failure limit 12, then parameter 26 is operating at a level that is believed to represent a failure of at least one control function of the engine control system. For example, assume parameter 26 represents a temperature signal that is capable of measuring to −40 degrees Fahrenheit, and the lower failure limit 12 represents a temperature of −45 degrees Fahrenheit. If parameter 26 becomes less than the lower failure limit 12, the engine control system will indicate the temperature signal has failed.

Set point 8 represents an optimal, desired, or predetermined target operating point for parameter 26. Upper 6 and lower 10 quality limits represent the maximum allowable deviation of parameter 26 from the set point 8 for parameter 26 to still be considered operating with a satisfactory level of quality. The present invention compares the magnitude of the parameter 26 to at least one of quality limits 6 and 10 to determine the quality of the system represented by parameter 26. In the event parameter 26 exceeds an upper or lower quality limit, the method will indicate the subsystem represented by parameter 26 is of less than desirable quality.

In some situations it may be desirable to verify quality during a certain time period. A quality check start point 20 may be implemented such that parameter 26 is compared against quality limits 6 and 10 only after the time represented by point 20. Similarly, a quality check of parameter 26 may also be made only prior to a quality check end point 22. In this case the parameter 26 is tested for quality only during the time period prior to quality check end point 22. In a more advanced application, the quality of parameter 26 may be compared to limits 6 and 10 only during a certain period after a triggering event 14 has occurred. In such a situation the period of time between event 14 and the quality check start point 20 represents a settling time of the system being verified. In another type of situation it may be desirable to test parameter 26 only during the period of time between points 20 and 22.

In yet another application of the invention, it may be desirable to use time as a determining element of quality. For example, suppose an event 14 causes parameter 26 to change magnitude. If the magnitude of the parameter 26 reaches the setpoint 8 prior to an upper time limit 18, then the quality of the system represented by parameter 26 is presumed to be sufficient. Similarly, it may be desirable for the parameter 26 to reach the set point 8 after a lower time limit 16 or, in yet another aspect of the invention, between the lower and upper time limits 16 and 18, respectively.

Figure 2:
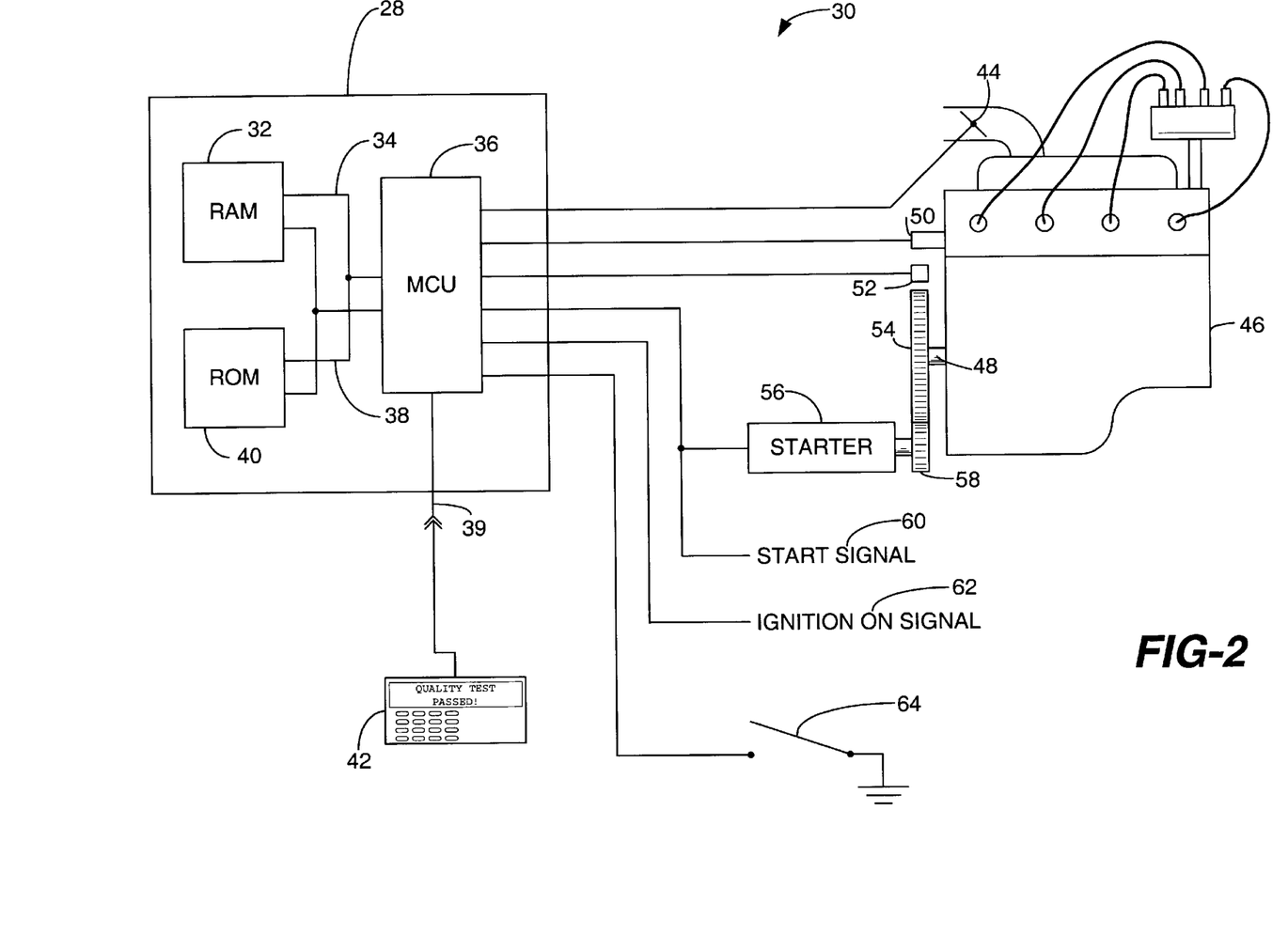
FIG. 2 is a block diagram of an engine control system using the present invention.

Turning now to FIG. 2, an exemplary engine control system 30 is shown in accordance with the present invention and arranged to determine the start quality of an engine 46. A relevant portion of the engine control system 30 is shown with the engine 46 having a crankshaft 48. A ring gear 54 is attached to the crankshaft 48 and engaged by a starter pinion gear 58. The starter pinion gear 58 is rotated by a starter motor 56 in response to a start signal 60. Rotating motion of the starter pinion gear 58 is transferred to the crankshaft 48 through the ring gear 54 in order to start the engine 46. Once started, the speed of rotation of the crankshaft is controlled by a throttle having a throttle position sensor (TPS) 44. The TPS 44 sends to the microcontroller unit (MCU) 36 a signal indicative of throttle position. The invention may be executed within a powertrain control module 28 having the MCU 36 with an address bus 34 and a data bus 38 electrically connected to random access memory (RAM) 32 and read-only memory (ROM) 40. The instructions and predetermined values for the method may reside within the ROM 40. Variables used by the method, such as a start test timer, a start flare test timer, and a peak start flare RPM, may reside in RAM 32. A crankshaft sensor 52 is electrically connected to the MCU 36 and produces a signal in response to rotation of the ring gear 54. A coolant temperature sensor 50 is electrically connected to the MCU 36 and produces a signal in response to the coolant temperature of the engine 46. An ignition on signal 62 is electrically communicated to the MCU 36 indicating an active ignition system.

Also shown in FIG. 2 is a scan tool 42 for reading information from the MCU 36 via a communication port 39. The invention may be implemented internal to the scan tool 42, with the MCU passing the data representing the physical parameter 26 and other requisite data to the scan tool 42. The scan tool would then use the invention to determine and indicate the quality of the engine control system 30. Alternately, the invention could be executed by the MCU 36, with the MCU 36 communicating results to a user via scan tool 42.

Figure 3A:
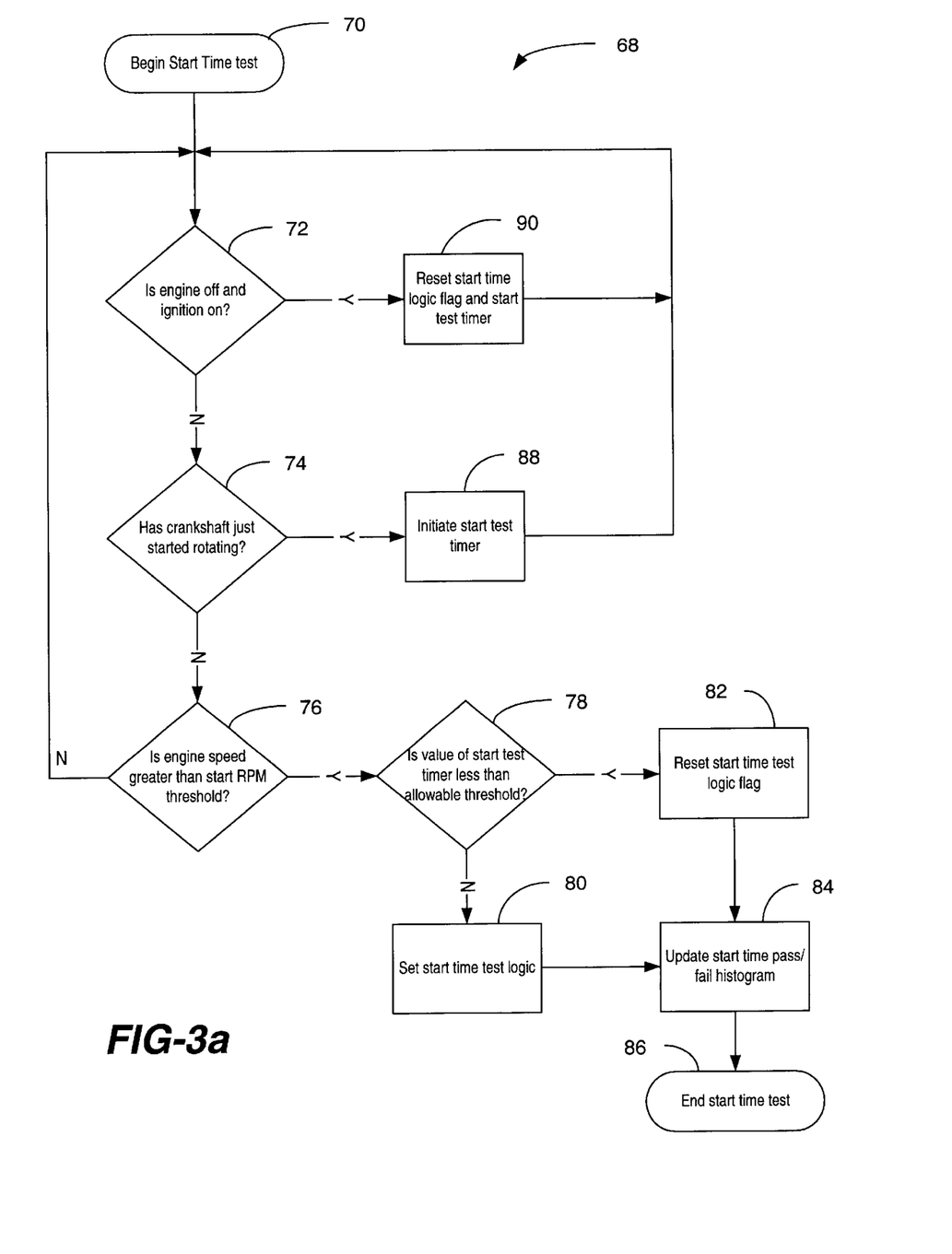
FIG. 3a is a flow diagram illustrating a method of performing a start time test with the present invention.
Figure 3B:
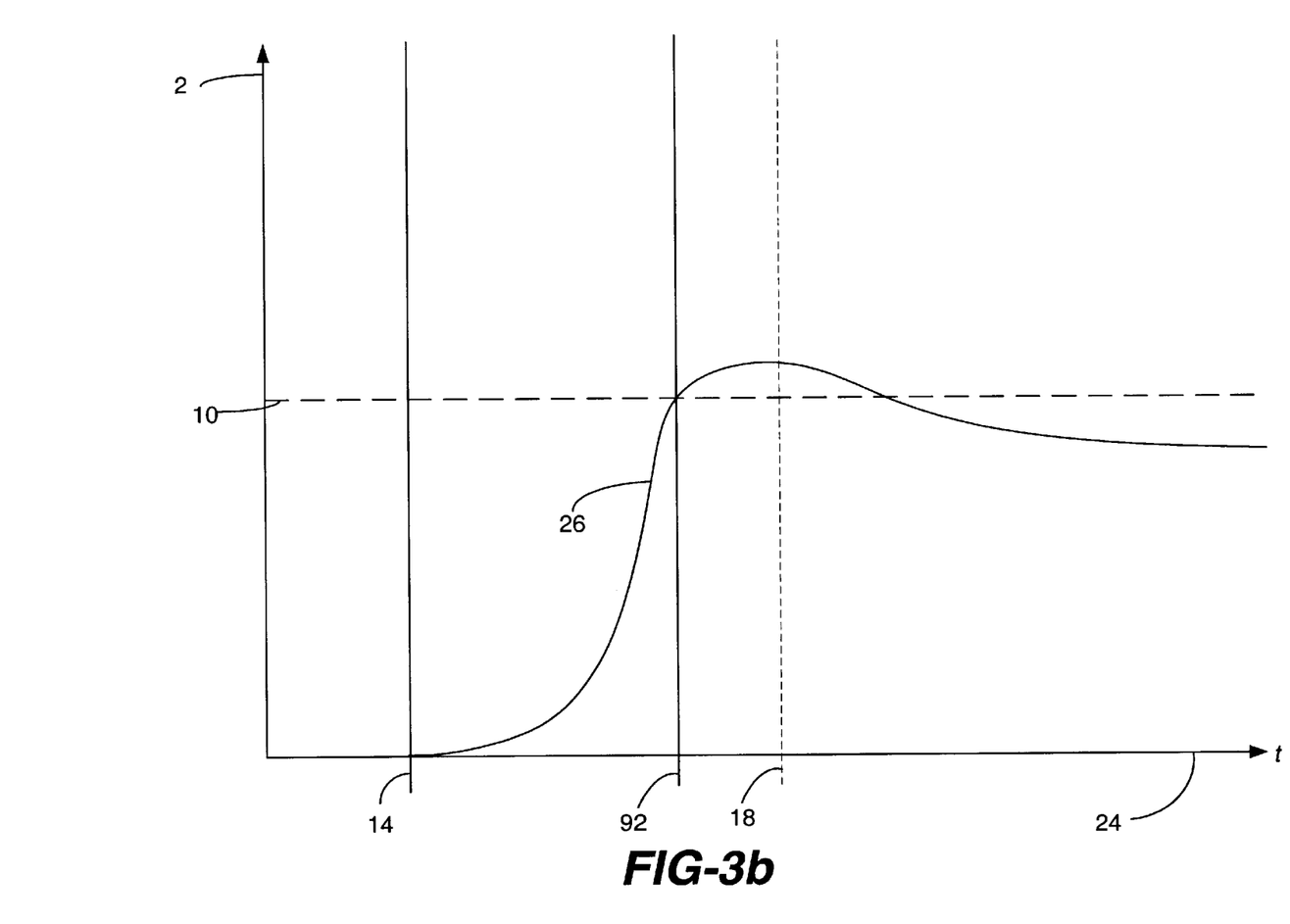

Turning to FIG. 3a, the method is used to determine start time quality of the engine control system 30. Start time quality refers to the amount of time needed for the engine 46 to start running once the starter 56 has begun rotating the crankshaft 48. Generally, an engine control system is considered to be of sufficient quality when the engine 46 starts as quickly as possible. FIG. 3b depicts a timing diagram of the method in the context of the start time quality test. The steps of determining start time quality using the invention are illustrated by a start time flow diagram 68, which begins in block 70. Moving from block 70 to decision block 72, the method determines whether the engine 46 is ready to start. In one aspect of the invention the determination of whether the engine 46 is ready to start is made by checking whether the engine is off (i.e. crankshaft 48 is not rotating) while the ignition on signal 162 is asserted. If the engine 46 is ready to start the method moves to block 90 where the method resets a start time logic flag and a start test timer before looping back to decision block 72. If, in decision block 72, the method determines that the engine is on 46 (i.e. crankshaft 48 is rotating) then the method moves to decision block 74. In decision block 74 the method determines whether the crankshaft 48 has just started rotating. If the determination is positive, the method moves to block 88 and initiates the start test timer 92 before returning to decision block 72. Referring briefly to FIG. 3b, the crankshaft 48 just beginning to rotate is an event 14, and the engine RPM is represented by parameter 26. If the determination is negative then the method moves to decision block 76 where the engine speed is compared to a predetermined start RPM threshold, represented as lower limit 10 in FIG. 3b. The start RPM threshold is set to a minimum threshold indicative that the engine is running on its own. If the engine speed is less than the predetermined start RPM threshold, the method returns to decision block 72. If the engine speed is greater than the predetermined start RPM threshold, the method moves to decision block 78. In decision block 78 the present value of the start test timer 92 is compared to an upper time limit 18. In one aspect of the invention the upper time limit 18 is a function of the signal magnitude of the coolant temperature sensor 50. It is generally desirable to increase the upper time limit 18 as the coolant temperature decreases. If the present value of the start test timer is less than the upper time limit 18, then the start time quality test has passed and the method moves to block 82. In block 82 the method clears the start time logic flag to show that the start time quality test has passed.

Returning to decision block 78, if the present value of the start test timer is greater than the upper time limit 18, then the start time quality test has failed and the method moves to block 80. In block 80 the method sets the start time logic flag to show that the start time quality test has failed. The method enters block 84 from one of block 82 and block 80. In block 84 the method updates a start time pass/fail histogram, which may be maintained in RAM 32, to reflect the start time test pass/fail determination. After updating the pass/fail histogram, the method of determining the start time quality test terminates by entering block 86.

Figure 4A:
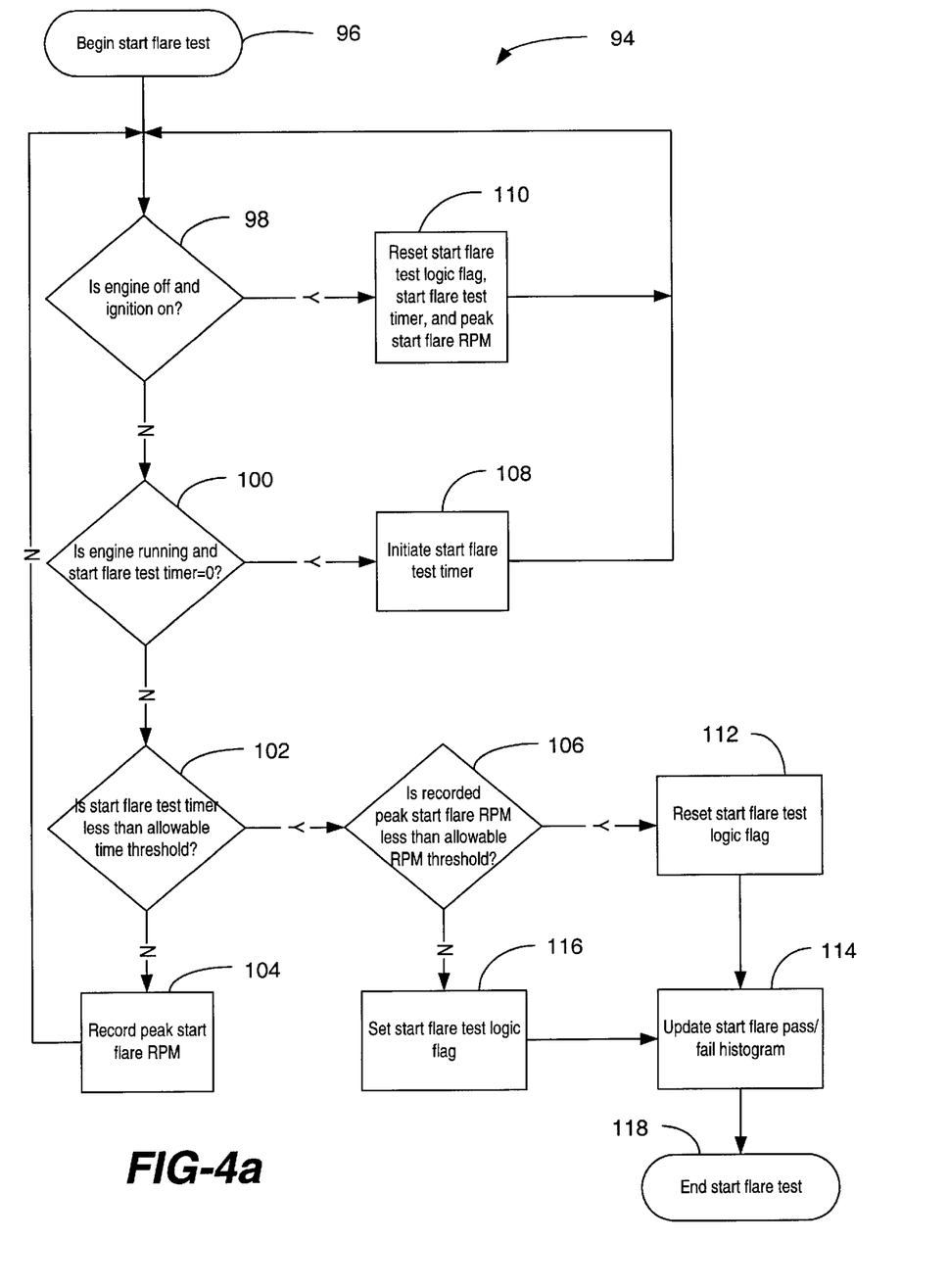
FIG. 4a is a flow diagram illustrating a method of performing a start flare test with the present invention.
Figure 4B:
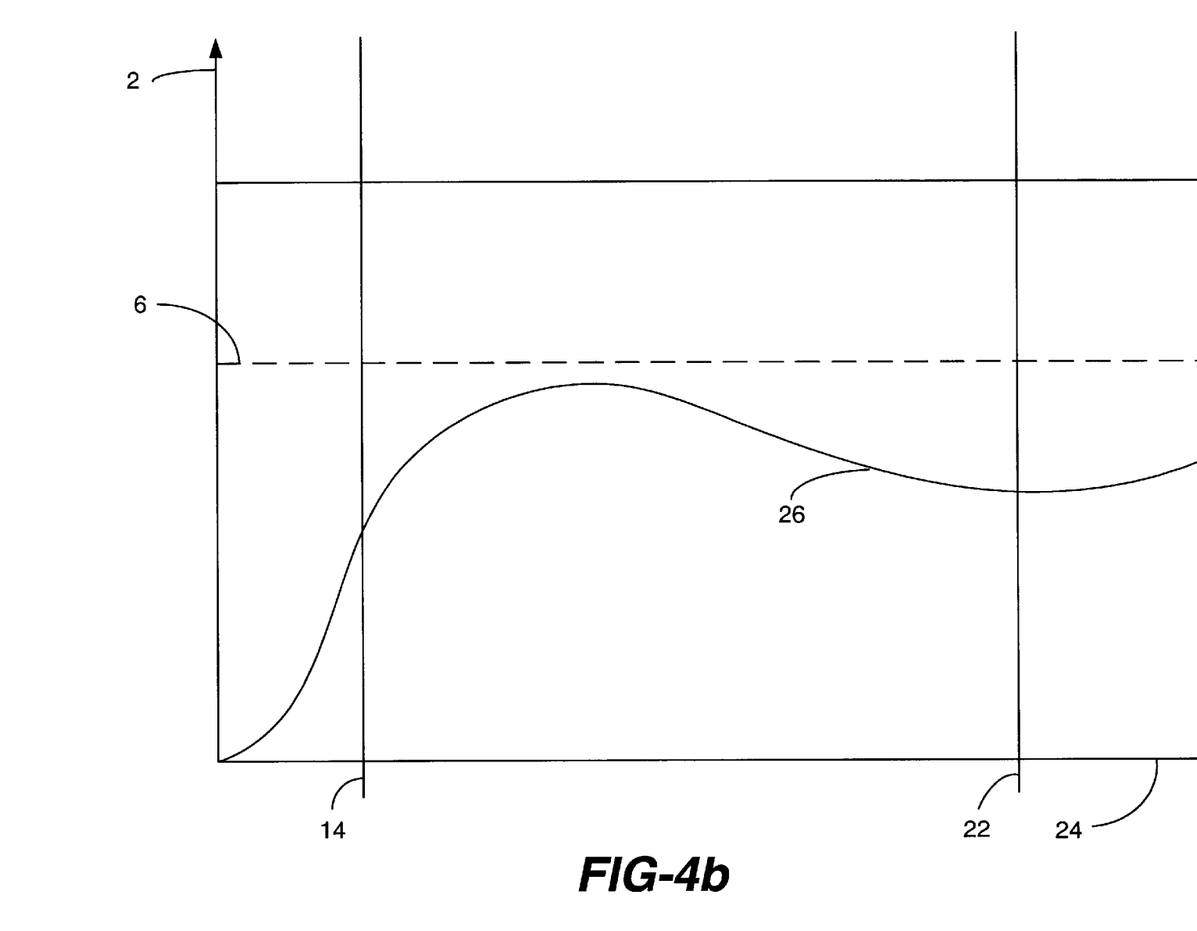

Turning to FIG. 4a, the method of the invention is adapted to determine the start flare quality of the engine control system 30. Start flare quality refers to the magnitude and duration that the engine RPM exceeds, or less likely, does not achieve, a desired idle speed during the moment just after the engine starts running. FIG. 4b shows an exemplary timing diagram of the method as adapted to determine start flare quality. Parameter 26 represents engine RPM, which is an indicator of quality for start flare. The start flare test will begin with event 14, marked by the engine reaching a start-run transfer RPM, and continue until the allowable time end point 22. The upper quality limit 6 represents the maximum engine speed allowable in a system 30 of satisfactory quality. Returning to FIG. 4a, the method begins in block 96. Moving from block 96 to decision block 98, the method determines whether the engine 46 is ready to start. In one aspect of the invention the determination of whether the engine 46 is ready to start is made by checking whether the engine 46 is off (i.e. crankshaft 48 is not rotating) while the ignition on signal 62 is asserted. If the engine 46 is about to start the method moves to block 110 where the method resets a start flare test logic flag, a start flare test timer and a peak start flare RPM value before returning to decision block 98. If, in decision block 98, the method determines that the engine 46 is on (i.e. crankshaft 48 is rotating) then the method moves to decision block 100. If, in decision block 100, the method determines that the start flare test timer is still in a reset state from block 110 and the engine 46 is running (i.e. crankshaft 48 RPM exceeds a predetermined threshold) then the method moves to decision block 108. In decision block 108 the method initiates the start flare test timer before returning to decision block 98. Returning to decision block 100, if the value of the start flare test timer is nonzero then the method proceeds to decision block 102. If, in decision block 102, the value of the start flare test timer is less than an allowable time end point 22, the method proceeds to block 104 where the method initiates recording the peak start flare RPM. The method then returns from block 104 to decision block 98. Again returning to decision block 102, if it is determined that the value of the start flare test timer is greater than the end point 22, the method proceeds to decision block 106. In decision block 106 the method determines whether the peak start flare RPM has exceeded an allowable RPM quality limit 6. If so, the start flare test has failed and the method sets the start flare test logic flag as instructed in block 116. If, in decision block 106, the peak start flare RPM is less than the allowable RPM quality limit, then the start flare test has passed and the method proceeds to block 112. In block 112 the method resets the start flare test logic flag. The method enters block 114 from one of block 116 and block 112. In block 114 the method updates a start flare pass/fail histogram, which may be maintained in RAM 32, to reflect the start flare test pass/fail determination. After updating the start flare pass/fail histogram the method terminates by entering block 118.

Figure 5:
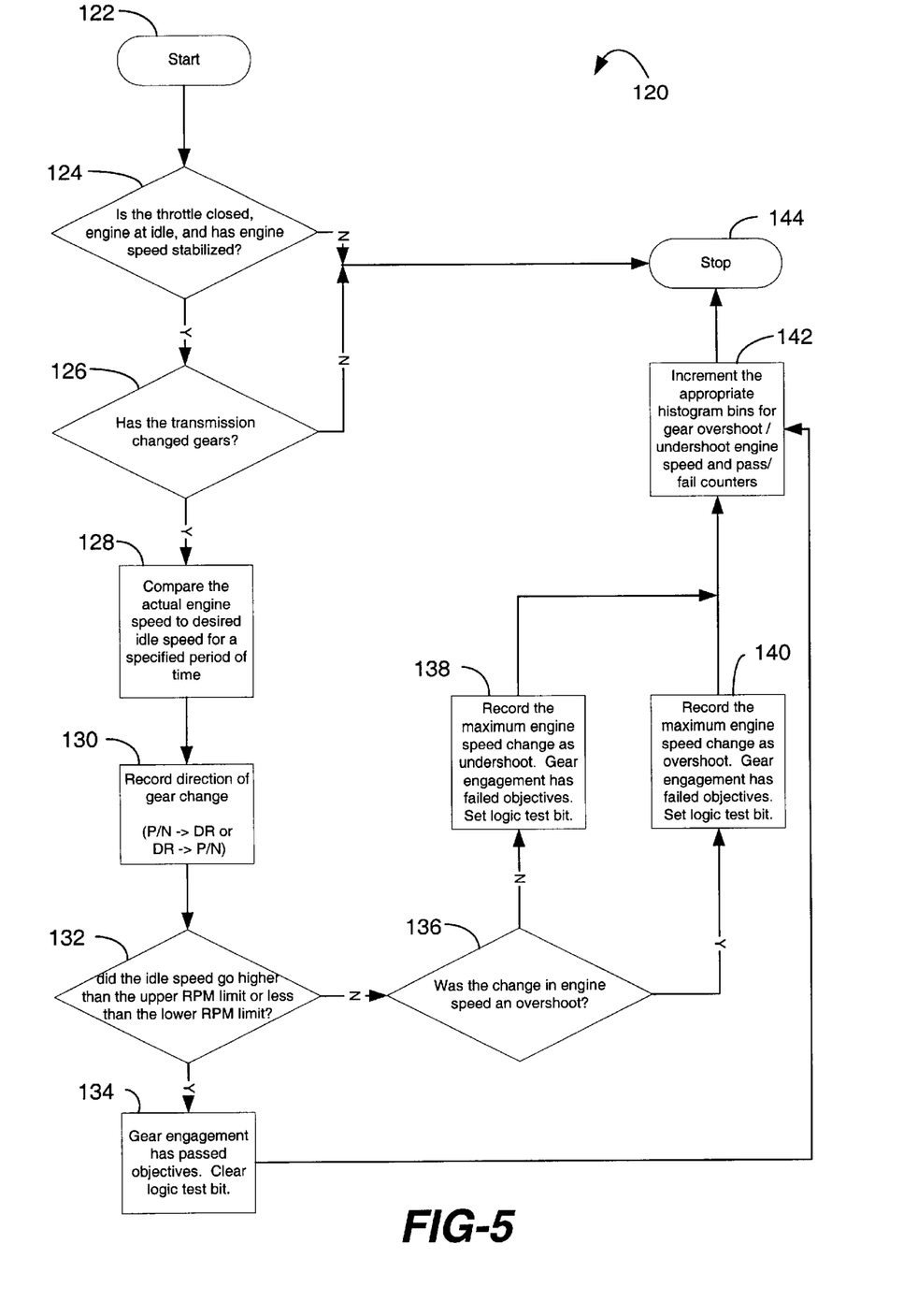
FIG. 5 is a flow diagram illustrating a method of performing a shift quality test with the present invention.

Turning now to FIG. 5, a flowchart showing the method adapted to determine the idle speed quality during a shift is illustrated. Idle speed quality refers to the stability of the idle speed while the load on the engine is changed due to a transmission (not shown) being shifted into or out of gear. The adapted method is illustrated by an idle speed control quality flow diagram 120, which begins in block 122. Moving from block 122 to decision block 124, the method determines whether a predetermined condition is met. In one aspect of the invention, the determination of whether the predetermined condition is met is made by determining whether the engine throttle blade 44 is closed, and the desired idle speed is approximately equal to the actual engine speed for a predetermined amount of time. If the predetermined condition is unsatisfied then the method proceeds to block 144 where the method terminates. If the predetermined condition in decision block 124 is met, the method proceeds to decision block 126. In decision block 126 the method determines whether the transmission has been shifted into, or out of, park or neutral as indicated by the P/N switch 64. The transmission shift is an event 14, with engine RPM being the parameter 26 representative of idle control quality during the shift. If the transmission did not shift, the method proceeds to block 144 where the method terminates. Returning to decision block 126, if the transmission has been shifted the method proceeds to block 128. In block 128 the method monitors the engine speed (parameter 26) during the period of time from the shift event 14 until the end point 22 of the test period. Once the test period is completed at end point 22, the method moves to block 130 where it records the direction of gear change. In one aspect of the invention the gear change can be out of drive/reverse and into park/neutral, or out of park/neutral and into drive/reverse.

After recording the direction of gear change, the method proceeds to decision block 132. In decision block 132 the method determines whether, during the test period, the engine RPM 26 either exceeded an upper quality limit 6 or fell below a lower quality limit 10. In a preferred embodiment, the upper and lower quality limits are a function of both the amount of time elapsed since the transmission shift event 14 occurred and engine coolant temperature as indicated by the coolant temperature sensor 50. The preferred function yields quality limits 6 and 10 approaching the idle speed set point as coolant temperature and elapsed time increase. Conversely, the preferred function yields quality limits 6 and 10 that diverge from the idle speed set point as coolant temperature and elapsed time decrease. If, in block 132, the method determines that the engine RPM 26 remained between the quality limits 6 and 10, the method proceeds to block 134 where a test flag is cleared.

Returning to decision block 132, if the method determines the engine RPM 26 fell outside of the quality limits 6 and 10 then the method proceeds to decision block 136. In decision block 136 the method determines whether the engine RPM 26 exceeded the upper quality limit 6 (an overshoot), or fell below the lower quality limit 10 (an undershoot). If the result of the determination in block 136 indicates an overshoot, the method proceeds from decision block 136 to block 140. In block 140 the method sets the test flag and, in one aspect of the invention, records the magnitude of the overshoot. Returning to block 136, if the result of the determination is an undershoot, the method proceeds to block 138. In block 138 the method sets the test flag and, in one aspect of the invention, records the magnitude of the undershoot. The setting of the flag in either of either blocks 138 and 140 indicates an unsatisfactory idle control quality during the transmission shift. The method enters block 142 from either block 134, block 138 or block 140. In block 142 the method maintains an acceptable/unacceptable shift histogram. The histogram tabulates the results of multiple executions of the method 120. The tabulated data includes the difference calculation from block 128, overshoot or undershoot from blocks 138 and 140, respectively, and the direction of gear change as determined in block 130. After updating the histogram, the method terminates by entering block 144.

Figure 6A:
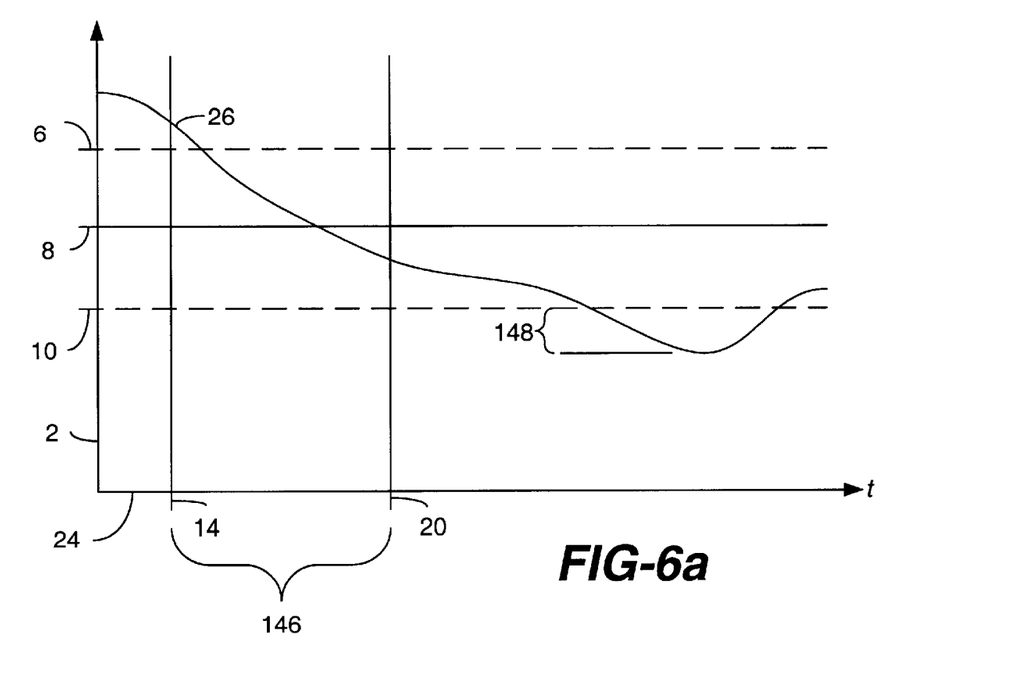
FIG. 6a is a timing diagram illustrating a speed control undershoot detected by the present invention.
Figure 6B:
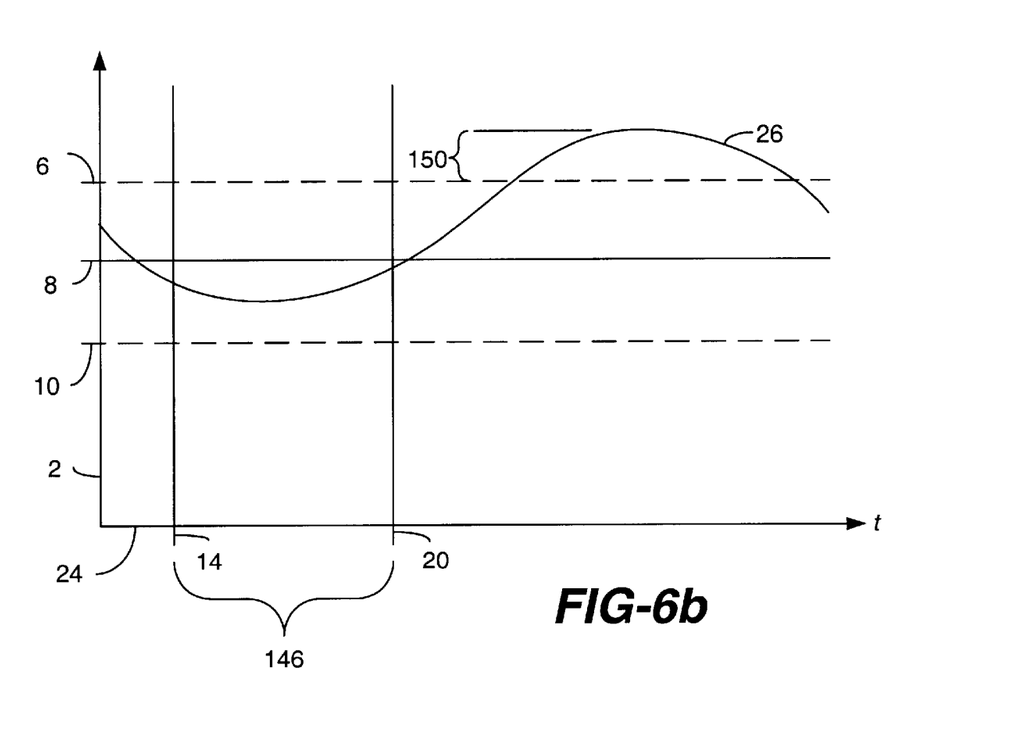
FIG. 6b is a timing diagram illustrating a speed control overshoot detected by the present invention.

Turning to FIGS. 6a and 6b, the invention is shown being applied to verifying the quality of a speed control system, also known as a cruise control system, for a vehicle. The horizontal axis 24 represents time and the vertical axis 2 represents vehicle speed. Vehicle speed is represented by the physical parameter 26. The desired speed is shown as the set point 8, and the upper and lower quality limits are shown as limits 6 and 10, respectively. To determine the quality of the system, the cruise control is engaged at event point 14. The vehicle speed is then allowed a settling time 146 to achieve the desired set point 8. The test begins as soon as the settling time 146 ends at point 20. Once the test begins, the vehicle speed 26 is continuously monitored and compared to the upper and lower quality limits 6 and 10. In the event the vehicle speed goes outside of these limits, the method indicates that the speed control system is of less than desirable quality. Coincident with such an indication, the method may also record the magnitude of vehicle speed error. FIG. 6a shows an instance where a vehicle speed undershoot 148 has occurred and FIG. 6B shows an overshoot 150. In each case the method may record the magnitude of the undershoot or overshoot. A user of the invention could then take the action needed to eliminate or minimize the magnitude of the overshoot or undershoot under the test condition.

The methods described herein can be successfully adapted to determining the quality of several other engine subsystems such idle control during engagement of different loads on the engine, minimum idle speed, oxygen sensor reaction time and knock system operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an electronic engine control system having diagnostics for determining whether the system is fully functional and a communications port for communicating with a diagnostic scan tool, a method for determining the quality of the system, the engine control system executing a method comprising the steps of:

monitoring an engine parameter representative of the quality of a subsystem of interest;

comparing said parameter to at least one quality limit, wherein said at least one quality limit represents an acceptable performance boundary for the fully functional engine control system, and based on the result of said comparing step, indicating whether said subsystem is of satisfactory quality.

2. The method of claim 1 further comprising the step of maintaining a histogram of the number of times said comparison step resulted in said indication of satisfactory quality versus the number of times said comparison step resulted in an indication of unsatisfactory quality.

3. The method of claim 1 further comprising capturing the difference between said parameter and said at least one quality boundary.

4. The method of claim 1 further comprising waiting for a predetermined condition to occur prior to comparing said parameter to said quality limits.

5. The method or claim 4 arranged to determine the start fire quality of the electronic engine control system wherein the system further comprises a start flare test timer of a predetermined duration, said start flare test timer is arranged to begin counting when said predetermined condition is satisfied;

said predetermined condition comprising an ignition switch being on coincident with an engine RPM of approximately zero;

said parameter comprising engine RPM;

said quality boundary comprising a maximum allowable RPM limit; and said comparison taking place between said maximum allowable RPM limit and said engine RPM; said subsystem being of satisfactory quality when said engine RPM remains less than said maximum allowable RPM limit until said start flare test timer has expired.

6. The method of claim 4 arranged to determine the speed control quality of the engine control system, said predetermined condition comprising said speed control system being engaged;

said parameter comprising vehicle speed;

said at least one quality boundary further comprising upper and a lower quality boundaries; and said comparison taking place between said vehicle speed and said upper and lower quality boundaries, said speed control system being of satisfactory quality when said vehicle speed remains less than said upper quality boundary and greater than said lower quality boundary during a time period after said predetermined condition.

7. The method of claim 4 arranged to determine the shift quality of the engine control system, said predetermined condition comprising a transmission being shifted into one of neutral and a drive gear;

said parameter comprising engine RPM;

said at least one quality boundary further comprising upper and a lower quality boundaries; and said comparison taking place between said engine RPM and said upper and lower quality boundaries, said shift quality being of satisfactory when said engine RPM remains less than said upper quality boundary and greater than said lower quality boundary during a time period after said predetermined condition.

8. In an electronic engine control system having diagnostics for determining whether the system is fully functional and a communications port for communicating with a diagnostic scan tool, the engine control system executing a method for determining the quality of the system comprising:

monitoring an engine parameter representative of the quality of a subsystem of interest;

comparing said parameter to at least one quality limit, wherein said at least one quality limit is a function of a second parameter and represents an acceptable performance boundary for the fully functional engine control system; and based on the result of said comparing step, indicating whether said subsystem is of satisfactory quality.

9. The method of claim 8 further comprising the step of maintaining a histogram of the number of times said comparison step resulted in said indication of satisfactory quality versus the number of times said comparison step resulted in an indication of unsatisfactory quality.

10. The method of claim 8 further comprising capturing the difference between said parameter and said at least one quality boundary.

11. The method of claim 8, said second parameter comprising engine coolant temperature.

12. The method of claim 8 further comprising waiting for a predetermined condition to occur prior to comparing said parameter to said quality limits.

13. The method of claim 12 arranged to determine the start flare quality of the electronic engine control system wherein the system further comprises a start flare test timer of a predetermined duration, said start flare test timer is arranged to begin counting when said predetermined condition is satisfied;

said predetermined condition comprising an ignition switch being on coincident with an engine RPM of approximately zero;

said parameter comprising engine RPM;

said quality boundary comprising a maximum allowable RPM limit; and said comparison taking place between said maximum allowable RPM limit and said engine RPM; said subsystem being of satisfactory quality when said engine RPM remains less than said maximum allowable RPM limit until said start fire test timer has expired.

14. The method of claim 12 arranged to determine the speed control quality of the engine control system, said predetermined condition comprising said speed control system being engaged;

said parameter comprising vehicle speed;

said at least one quality boundary further comprising upper and a lower quality boundaries; and said comparison taking place between said vehicle speed and said upper and lower quality boundaries, said speed control system being of satisfactory quality when said vehicle speed remains less than said upper quality boundary and greater than said lower quality boundary during a time period after said predetermined condition.

15. The method of claim 12 arranged to determine the shift quality of the engine control system, said predetermined condition comprising a transmission being shifted into one of neutral and a drive gear;

said parameter comprising engine RPM;

said at least one quality boundary further comprising upper and a lower quality boundaries; and said comparison taking place between said engine RPM and said upper and lower quality boundaries, said shift quality being of satisfactory when said engine RPM remains less than said upper quality boundary and greater than said lower quality boundary during a time period after said predetermined condition.

16. In an electronic engine control system having diagnostics for determining whether the system is fully functional and a communications port for communicating with a diagnostic scan tool having a display, the engine control system executing a method for determining the quality of the system comprising:

maintaining a timer;

monitoring an engine parameter of interest while said timer is active;

comparing said parameter to at least one limit;

upon said parameter reaching said at least one limit, comparing the present value of said timer to a quality boundary, wherein said quality boundary represents an acceptable performance boundary for the fully functional engine control system; and based on the result of said comparison of said timer to said quality boundary, causing the display to indicate whether said subsystem is of satisfactory quality.

17. The method of claim 16 wherein said quality boundary is the function of a second parameter.

18. The method of claim 17 wherein said timer becomes active upon the occurrence of a predetermined event.

19. The method of claim 18 wherein said second parameter is engine coolant temperature.

20. The method of claim 19 arranged to determine the start time quality of an internal combustion engine, said engine parameter of interest comprising engine RPM;

said at least one limit comprising an RPM indicative of said engine running;

said predetermined event comprising a crankshaft of said engine just beginning to rotate; and said quality limit represents the maximum desirable time required for the engine to start.

* * * * *